(12) United States Patent
Saccomanno et al.

(10) Patent No.: US 7,258,467 B2
(45) Date of Patent: Aug. 21, 2007

(54) LOW PROFILE DIRECT/INDIRECT LUMINAIRES

(75) Inventors: Robert J. Saccomanno, Montville, NJ (US); Ivan B. Steiner, Ridgewood, NJ (US)

(73) Assignee: Honeywell International, Inc., Morristown, NJ (US)

(*) Notice: Subject to any disclaimer, the term of this patent is extended or adjusted under 35 U.S.C. 154(b) by 94 days.

(21) Appl. No.: 11/078,723

(22) Filed: Mar. 14, 2005

(65) Prior Publication Data

US 2005/0201102 A1    Sep. 15, 2005

Related U.S. Application Data

(60) Provisional application No. 60/552,433, filed on Mar. 12, 2004, provisional application No. 60/563,010, filed on Apr. 19, 2004.

(51) Int. Cl.
*F21V 7/00* (2006.01)
*F21S 4/00* (2006.01)
*F21S 8/00* (2006.01)

(52) U.S. Cl. ............ 362/346; 362/298; 362/147; 362/217

(58) Field of Classification Search ........... 362/346, 362/298, 147, 217
See application file for complete search history.

(56) References Cited

U.S. PATENT DOCUMENTS

| | | | | |
|---|---|---|---|---|
| 2,971,083 A * | 2/1961 | Phillips et al. | ............ | 362/342 |
| 4,747,027 A * | 5/1988 | Rieger | ............ | 362/217 |
| 4,794,501 A * | 12/1988 | Bartenbach | ............ | 362/298 |
| 5,343,373 A * | 8/1994 | Tillotson | ............ | 362/217 |
| 5,570,947 A * | 11/1996 | Felland | ............ | 362/148 |
| 5,676,453 A | 10/1997 | Parkyn, Jr. et al. | | |
| 5,676,457 A | 10/1997 | Simon | | |
| 5,810,469 A | 9/1998 | Weinreich | | |
| 5,897,201 A | 4/1999 | Simon | | |
| 6,185,357 B1 | 2/2001 | Zou et al. | | |
| 6,305,811 B1 | 10/2001 | Beeson et al. | | |
| 6,485,164 B2 | 11/2002 | Saccomanno | | |
| 6,572,234 B1 * | 6/2003 | Maier et al. | ............ | 362/20 |
| 6,641,282 B2 * | 11/2003 | Perlo et al. | ............ | 362/217 |
| 6,729,741 B1 | 5/2004 | Murray | | |
| 6,793,368 B2 * | 9/2004 | Ladstatter | ............ | 362/217 |
| 6,837,592 B1 * | 1/2005 | Dahlen | ............ | 362/217 |
| 6,837,593 B1 * | 1/2005 | Schutz et al. | ............ | 362/218 |
| 6,913,378 B2 * | 7/2005 | Ho | ............ | 362/560 |
| 6,942,366 B2 * | 9/2005 | Mohacsi | ............ | 362/300 |
| 7,121,690 B1 * | 10/2006 | Ramer et al. | ............ | 362/297 |
| 7,156,540 B2 * | 1/2007 | Haines | ............ | 362/298 |

(Continued)

FOREIGN PATENT DOCUMENTS

CH    275276 A    5/1951

(Continued)

*Primary Examiner*—Jong-Suk (James) Lee
*Assistant Examiner*—David Makiya
(74) *Attorney, Agent, or Firm*—Ingrassia Fisher & Lorenz (57) ABSTRACT

A luminaire for distributing light rays from a light source may include first and second reflector sections. The first reflector portion may be configured to direct light rays in a first direction substantially perpendicular to a longitudinal axis of the luminaire. The second reflector portion is disposed along the longitudinal axis configured to direct light rays in a second direction. The second direction may have a directional component substantially normal to the longitudinal axis and the first direction.

16 Claims, 8 Drawing Sheets

U.S. PATENT DOCUMENTS

| | | |
|---|---|---|
| 2004/0047162 A1 | 3/2004 | Saccomanno et al. |
| 2004/0095771 A1* | 5/2004 | McDonald .................. 362/346 |
| 2005/0201093 A1* | 9/2005 | Saccomanno et al. ...... 362/257 |
| 2005/0201103 A1* | 9/2005 | Saccomanno et al. ...... 362/341 |
| 2006/0232960 A1* | 10/2006 | Pfund ........................ 362/223 |

FOREIGN PATENT DOCUMENTS

| | | |
|---|---|---|
| EP | 0846915 A | 6/1998 |
| EP | 1033530 A | 9/2000 |
| WO | WO 0165171 A | 9/2001 |
| WO | WO 2004040963 A | 5/2004 |

* cited by examiner

LOW PROFILE DIRECT/INDIRECT LUMINAIRES

CROSS-REFERENCE TO RELATED APPLICATIONS

This application claims the benefit of priority of U.S. provisional application No. 60/552,433, filed on Mar. 12, 2004, and U.S. provisional application No. 60/563,010, filed on Apr. 19, 2004, both of which are incorporated herein by reference in their entirety.

BACKGROUND OF THE INVENTION

1. Technical Field

This invention relates to the field of artificial lighting and more specifically to luminaires of the direct-indirect type for illuminating interiors.

2. Background

Any discussion of the prior art throughout the specification should in no way be considered as an admission that such prior art is widely known or forms part of common general knowledge in the field.

In the field of artificial lighting, and particularly in applications for illuminating interiors, the luminaire structure surrounding a source of light directs light to one or more surfaces of an interior space, or additionally, to one or more objects it contains. A portion of the light from the light source can fall directly on one or more surfaces of that interior space or on one or more objects it contains without first impinging on or passing through any luminaire structure. Light sources used in luminaires include lamps such as linear or circular tubular fluorescent lamps, incandescent light bulbs, light emitting diodes (LEDs), and high intensity discharge (HID) lamps such as ceramic metal halide (CMH) lamps.

Typically, a luminaire can be a light fixture that projects light on the ceiling of a room (an up-light fixture), the floor of a room (a down-light fixture), one or more walls of a room, one or more objects in a room, or any combination of the above.

Attributes used to evaluate the performance of a luminaire may include any one or more of the following:

Efficiency, which is the number of lumens output flux per electrical watt of input power.

The illuminance generated.

The incident down-light distribution, which determines the illuminance uniformity it produces on the floor of a room from both direct and indirect down-light flux. "Direct" down-light flux falls on the room's floor (or on objects standing on that floor) directly from the luminaire. "Indirect" down-light flux falls on a room's floor (or on objects standing on that floor) after first reflecting from the room's ceiling or walls.

The angular distribution of direct down-light intensity. For example, a "bat-wing" intensity angular distribution may be preferred, which can make illuminance from direct down-light flux more uniform.

The ratio of down-light flux to up-light flux. Luminaires comprising a mix of down-light and up-light are described in U.S. Pat. No. 4,472,767, U.S. Pat. No. 5,884,994, U.S. Pat. No. 6,457,844, and WO 03/036161 A1.

The glare it generates, which is most important when illuminating work areas typically used for tasks performed during many hours of a workday. For example, it is important to limit glare in areas where extensive use of computer monitors exists.

Aesthetic appeal. For example, crystal chandeliers are often integrated into the design of a light fixture to enhance its beauty. Accordingly, a "crystalline effect" is often sought in luminaire designs.

Costs to fabricate, operate, and maintain.

Generally, a luminaire's performance is best when its efficiency is high. High efficiency lowers lighting costs owing to fewer watts of electrical power needed to generate a required luminous output and fewer luminaires needed to light a given room to desired levels of illuminance and illuminance uniformity. A luminaire's performance is also best when the illuminance it generates on the floor of a room is uniform to a specified degree, the glare it produces is sufficiently low, and it is aesthetically pleasing. It is also desirable for the costs associated with the luminaire's fabrication, operation, and maintenance are low.

Specific values or limits for each of these attributes depend on the luminaire's application and on the end user's preferences. Two lighting standards often used for evaluating interior lighting are DIN 5035 parts 1 and 7, and ANSI/IESNA RP-1-04, both incorporated by reference herein in their entirety.

Incorporated herein by reference in their entirety are U.S. patent application Ser. No. 10/366,337, filed on Feb. 14, 2003 and U.S. provisional application No. 60/409,269, filed Sep. 10, 2002. Both of these are assigned to the assignee of the present invention.

Also, incorporated herein by reference in its entirety is U.S. Pat. No. 4,641,315, "Modified Involute Flashlamp Reflector", granted on Feb. 3, 1987 and assigned to The Boeing Company. This patent discloses a set of parametric equations that can be used to define the shape of cusp reflectors that project light emitted by tubular cylindrical lamps without directing any reflected light back to the cylindrical surface of lamp envelopes. Avoiding back-reflections to the lamp reduces light absorption by the lamp. Accordingly, this improves efficiency by increasing the amount of light flux projected out from a cusp reflector/lamp fixture for a given electrical power input.

Ideally, a luminare

Would have a luminaire efficiency (ratio of the total light output from the luminaires to the total output from the bare lamp(s) that fits into it) exceeding 90%. This lowers operational costs. Also, by requiring fewer luminaires to light a given area, it lowers fabrication and maintenance costs while further reducing operational costs.

Would be a light fixture providing both up-light (indirect) and down-light (direct) illumination or side-light (indirect) and down-light illumination (direct). A combination of indirect and direct illumination can be both highly efficient and aesthetically pleasing.

Would have little or no down-light flux projected at angle of 45 degrees or greater from vertical.

May have down-light flux projected with a "bat-wing" intensity angular distribution. This enhances illuminance uniformity.

Would have a tunable design capable of satisfying user preferences by providing down-light to up-light or down-light to side-light ratios over a wide range of values (up to unity, or higher) while maintaining high luminaire efficiency.

SUMMARY OF THE INVENTION

According to various aspects of the invention, a luminaire for distributing light rays from a light source may include first and second reflector sections. The first reflector portion may be configured to direct light rays in a first direction substantially perpendicular to a longitudinal axis of the luminaire. The second reflector portion is disposed along the longitudinal axis configured to direct light rays in a second direction. The second direction may have a directional component substantially normal to the longitudinal axis and the first direction.

According to various aspects of the invention, a lighting assembly configured to be mounted to a ceiling may include an elongated light source having a longitudinal axis and first and second reflector portions. The first reflector portion may be between the light source and the ceiling and configured to direct light rays in a first direction away from the ceiling. The second reflector portion may be disposed along the longitudinal axis and configured to direct light rays in a second direction. The second direction may be substantially parallel with the ceiling and normal to the longitudinal axis.

According to various aspects of the invention, a lighting assembly configured to be mounted to a ceiling may include a plurality of elongated light sources each having a longitudinal axis. The light sources may be arranged substantially parallel with one another in a spaced apart relationship in an array aligned substantially parallel with the ceiling. The assembly may further include a plurality of first reflector portions and a plurality of second reflector portions. Each of the first reflector portions may be between one of the light sources and the ceiling and configured to direct light rays in a first direction away from the ceiling. The plurality of first reflector portions and the plurality of second reflector portions may be disposed alternately along the longitudinal axes of the light sources. The second reflector portion may be configured to direct light rays in a second direction. The second direction being substantially parallel with the ceiling and normal to the longitudinal axis. At least one waveguide may extend between each pair of adjacent light sources and be configured to direct light rays in the second direction and toward the ceiling.

BRIEF DESCRIPTION OF THE DRAWINGS

The accompanying drawings, which are incorporated in and form part of the specification, illustrate various aspects of the present invention and, together with the description, describe those various aspects. Throughout the drawings, like numbers are used to represent like parts.

DETAILED DESCRIPTION OF THE INVENTION

The following detailed description is provided to facilitate an understanding of some of the innovative features unique to the present invention. A full appreciation of the various aspects of the invention can only be gained by taking the entire specification, claims, drawings, and abstract as a whole.

Figure 1:
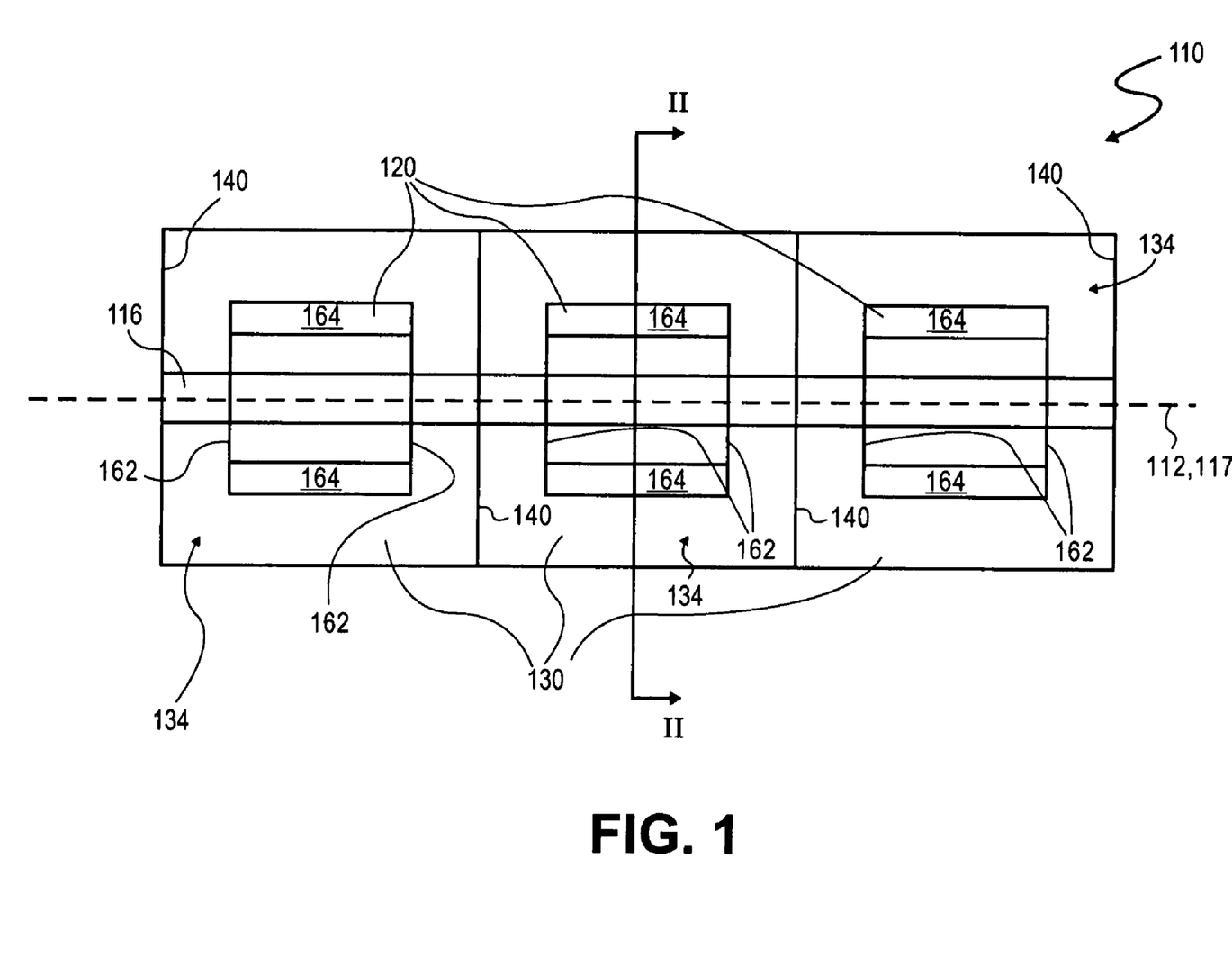
FIG. 1 is a top plan view of an exemplary luminaire in accordance with various aspects of the invention.
Figure 2:
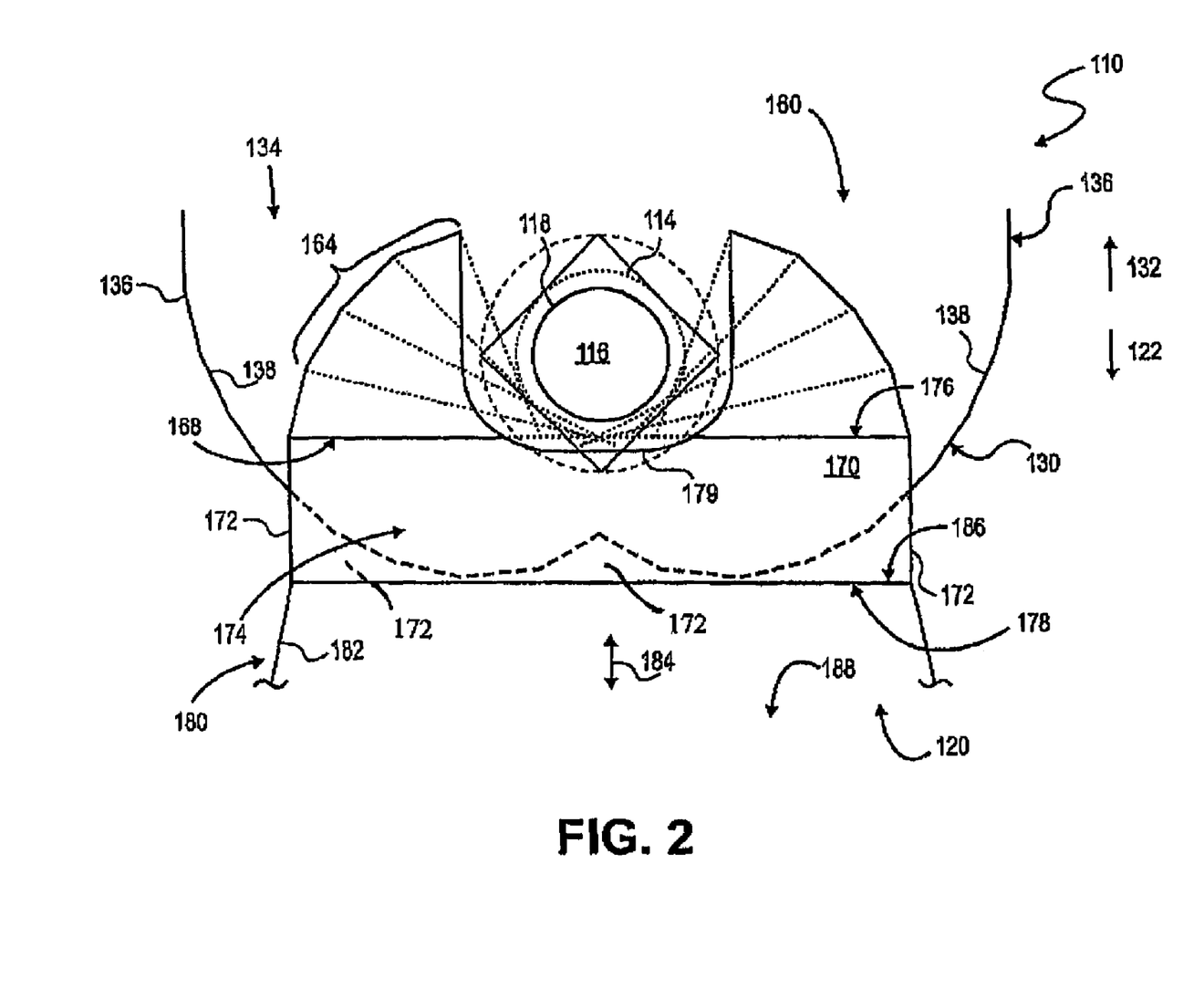
FIG. 2 is a cross-sectional view along line II-II of FIG. 1.

An exemplary embodiment of a luminaire 110 is shown in FIGS. 1 and 2. The luminaire 110 has a longitudinal axis 112 and a region 114 configured to contain a lamp 116, for example, a tubular, cylindrical fluorescent lamp, having a lamp axis 117, which may be coincident with the longitudinal axis 112. The lamp region 114 extends longitudinally along the longitudinal axis 112 of the luminaire 110. The lamp region 114 may also be referred to as a lamp clearance envelope. The lamp region 114 comprises an area slightly larger than a cross-sectional area of the lamp 116, so as to account for alignment or manufacturing tolerances.

The luminaire 110 may include at least one first reflector portion 120 configured to direct light rays in a first direction 122 substantially perpendicular to the longitudinal axis 112 of the luminaire 110. For example, each of the first reflector portions 120 may comprise a down-light reflector for directing light toward a floor of a room or area. As shown in FIG. 1, the first reflector portions 120 may be arranged in an array extending along the longitudinal axis 112 of the luminaire 110. The array of first reflector portions 120 may be substantially linearly and contiguously arranged above the lamp 116 (with respect to a ceiling mounted luminaire 110) and may be oriented along a line parallel to the lamp 116 and span the length of the lamp 116.

The luminaire 110 may also include at least one second reflector portion 130 configured to direct light rays in a second direction 132 substantially opposite to the first direction 122. For example, each of the second reflector portions 130 may comprise an up-light reflector for directing light toward a ceiling of a room or area. As shown in FIG. 1, the second reflector portions 130 may be arranged in an array extending along the longitudinal axis 112 of the luminaire 110. The array of second reflector portions 130 may be substantially linearly arranged along and below the lamp 116 (with respect to a ceiling mounted luminaire 110), spanning the length of the lamp 116. The second reflector portions 130 may extend partially around the lamp 116, with an opening 134 above the lamp 116.

One or more of the first reflector portions 120 may comprise three reflective sections 160, 170, 180 for providing an increased ratio of down-light flux to up-light flux. The first reflective section 160 may include two planar mirror elements 162 with surfaces substantially normal to the lamp axis 117 and two curved mirror elements 164 with surfaces substantially parallel to the lamp axis 117. Each of the two curved mirror elements 164 are bounded at one end by a respective planar mirror element 162. The opposite ends of the curved elements 164 define an output port 168. Both sides of the planar elements 162 may be mirrored. The surfaces of the curved elements 164 that face toward the lamp 116 may be mirrored. The rectangular cross-sectional area of the first reflective section 160 normal to the vertical (with respect to a ceiling mounted luminaire 110) and enclosed by these four mirrors varies along the vertical direction. The slopes of the two curved mirrors 164 in a plane of the output port 168 may also be substantially vertical.

A second reflective section 170, for example, a down-light mirror section, may include four planar mirrors 172 in which two are normal and two are parallel to the lamp axis 117 and parallel to a vertical line (with respect to a ceiling mounted luminaire 110). The four planar mirrors 172 truncate each other and enclose a hollow cavity 174 that has a uniform square or rectangular cross-section in planes normal to the vertical. The second reflective section 170 may include an input port 176 in a plane substantially tangential to lamp region 114 and an output port 178 in a plane that is parallel to and below the input port 176. The input port 176 is substantially contiguous with the output port of the first reflective section 160. Two of the planar mirrors 162 extending transversely with respect to the lamp axis 117 have a cutout 179 (or slot) slightly larger than the lamp region 114 and substantially concentric with the region 114. Accordingly, the cutout 179 defines a segment of a circular area on the edges of the input port 176 of the two planar mirrors. These cutouts 179 ensure sufficient clearance between the planar mirror edges and the lamp surface 118 when the lamp 116 has the maximum diameter and the maximum downward displacement allowable by its tolerances.

The vertical length of the second reflective section 170 may be sufficient to protrude through the bottom of the second reflector portion 130. Accordingly, the area of the second reflector portion 130 that intersects the protruding area of the first reflector portion 120 may be cut out to allow passage of flux, for example, down-light flux. The internal planar surfaces of the second reflective section 170 are mirrored, as are the external planar surfaces extending transversely with respect to the lamp axis 117. However, the external planar surfaces extending parallel to the lamp axis 117 need not be mirrored.

A third reflective section 180, for example, a down-light mirror section, may comprise a hollow pyramidal collimator element 182 mirrored on its internal planar surfaces. The external planar surfaces may or may not be mirrored. The collimator element 182 has a vertical axis 184 (with respect to a ceiling mounted luminaire 110), and the shape of cross-sectional areas in planes normal to and along the vertical axis 184 is substantially uniform. The third reflective section 180 may include an input port 186 interfacing contiguously with the output port 178 of the second reflective section 170. The third reflective section 180 may include an output port 188 larger than the input port 186, which thereby provides collimation.

In a conventional luminaire having a down-light hollow mirror cavity with an input port located below the lamp, the amount of lamp flux it can capture and project downward is limited for any given input port area size. For those conventional luminaires, down-light to up-light flux projection ratios approaching 1.0 are impossible. However, according to various aspects of the invention, a luminaire may have a first reflective section that partially or entirely wraps around the cylindrical lamp surface without reflecting any light rays from the lamp back to the lamp phosphor. By wrapping around the lamp, more light from the lamp can be captured than in embodiments with an input port below the lamp.

One skilled in the art would recognize that the pyramidal collimator sections can alternatively morph from smaller square or rectangular input ports to larger contiguous circular or elliptical output ports. However, this configuration would either (a) lessen down-light collimation owing to a smaller output port area when its input port area remains unchanged, or (b) lessen the amount of down-light flux while it increases the amount of up-light flux by reducing input port area to maintain collimation.

In another embodiment of the pyramidal collimator sections, the four sides can be altered to have two-dimensional (2D) curvature while maintaining the same square or rectangular cross-sectional shape along its axis. Ideally, the 2D curvature's shape in planes normal to each pair of its opposing sides would be that of a compound parabolic concentrator (CPC). Functionally, these CPC shaped mirrors operate in a reverse manner from how a CPC normally operates. For this application, light enters through a small input port and exits through a larger output port, whereas light enters a conventional CPC through a large input port and exits through a smaller output port. Accordingly, this hollow mirror cavity collimates light instead of concentrating it, as a CPC would do when operated in a conventional mode.

The 2D curved-sided CPCs may have an advantage over hollow pyramidal mirror cavities with flat sides in that they can achieve the same collimation performance as the latter while possessing a shorter overall length. The CPCs having 2D curved sides are known in the art. For example, FIG. 10.7 of section 10.4 in "High Collection Nonimaging Optics" by W. T. Welford and R. Winston (Academic Press, 1989) illustrates a "trough concentrator." Two trough concentrators that intersect at right angles and truncate each other form the third hollow mirror cavity of this embodiment.

The hollow cavity of each down-light element of the array of first reflector portions 120 may have a square or rectangular output port aperture to facilitate contiguous placement of adjacent array elements. For rectangular output port apertures, the direction of the long rectangular dimension should be normal to the lamp axis 117. This allows for closer spacing of array elements along the direction of the lamp axis 117, which increases the amount of downward-projected light relative to that projected upward. Accordingly, it may be advantageous for down-light array elements to have minimal spacing in the tubular lamp axis direction so as to increase the ratio of down-light lumens to up-light lumens.

It should be appreciated that one or more of the second reflector portions 130 could be optionally configured to distribute light in a batwing shape. For example, a reflector (e.g., a v-shaped reflector such as that shown in FIG. 4) could be disposed above the lamp 116. As a result, light rays reflected from the second reflector portion 130 in the second direction 132 can be distributed laterally outward from the longitudinal axis 112 of the luminaire 110, while a directional component of the light rays remains in the second direction 132. Such a distribution of light may be referred to as a batwing distribution. Since a batwing distribution provides more up-light further out from the luminaires, a plurality of luminaires can be spaced further apart in a given room or area, thereby reducing the number of luminaires required to sufficiently illuminate the given room or area.

The mirrored interior surface of one or more of the second reflector portions 130 may be configured as an up-light cusp reflector, such as that in U.S. Pat. No. 4,641,315, entitled "Modified Involute Flashlamp Reflector." This type of up-light cusp reflector may substantially eliminate the reflection of any incident light ray from the lamp 116 back to any portion of a lamp surface 118. By avoiding a typical 25% absorption loss for light rays incident on the lamp phosphor, the up-light projection efficiency increases.

Although some up-light destined rays from the lamp 116 may reflect multiple times from corresponding the second reflector portion 130, most of them either reflect only once or pass directly through the top opening 134 of the corresponding second reflector portion 130. Since each second reflector portion 130 can have a specular reflectance of about 95%, the efficiency of this configuration can be made close to ideal.

According to various aspects, one or more of the second reflector portions 130 may comprise two opposing two-dimensional (2D) curved mirrors 136 having curvature in planes normal to the longitudinal axis 112 and no curvature in planes parallel to the longitudinal axis 112. Accordingly, the opposing 2D curved mirrors may have surfaces 138 parallel to the lamp 116 disposed between them and may span the length of the lamp 116. Planar mirrors 140 normal to the longitudinal axis 112 of the luminaire 110 may cap the two ends of the 2D mirrors of each first reflector portion in the array. The planar mirrors 140 may be mirrored on both sides.

As is known in the art, a slot (not shown) may be provided in the top of each planar mirror 140 to allow easy installation and removal of the lamp from above the luminaire 110. Lamp electrical pin connectors (not shown) at the ends of each lamp may protrude through the slots in the luminaire's planar end cap mirrors. This allows the lamp to be installed in the usual manner into conventional fluorescent lamp electrical pin sockets (not shown), which can be attached externally to the luminaire's planar end cap mirrors.

Figure 3:
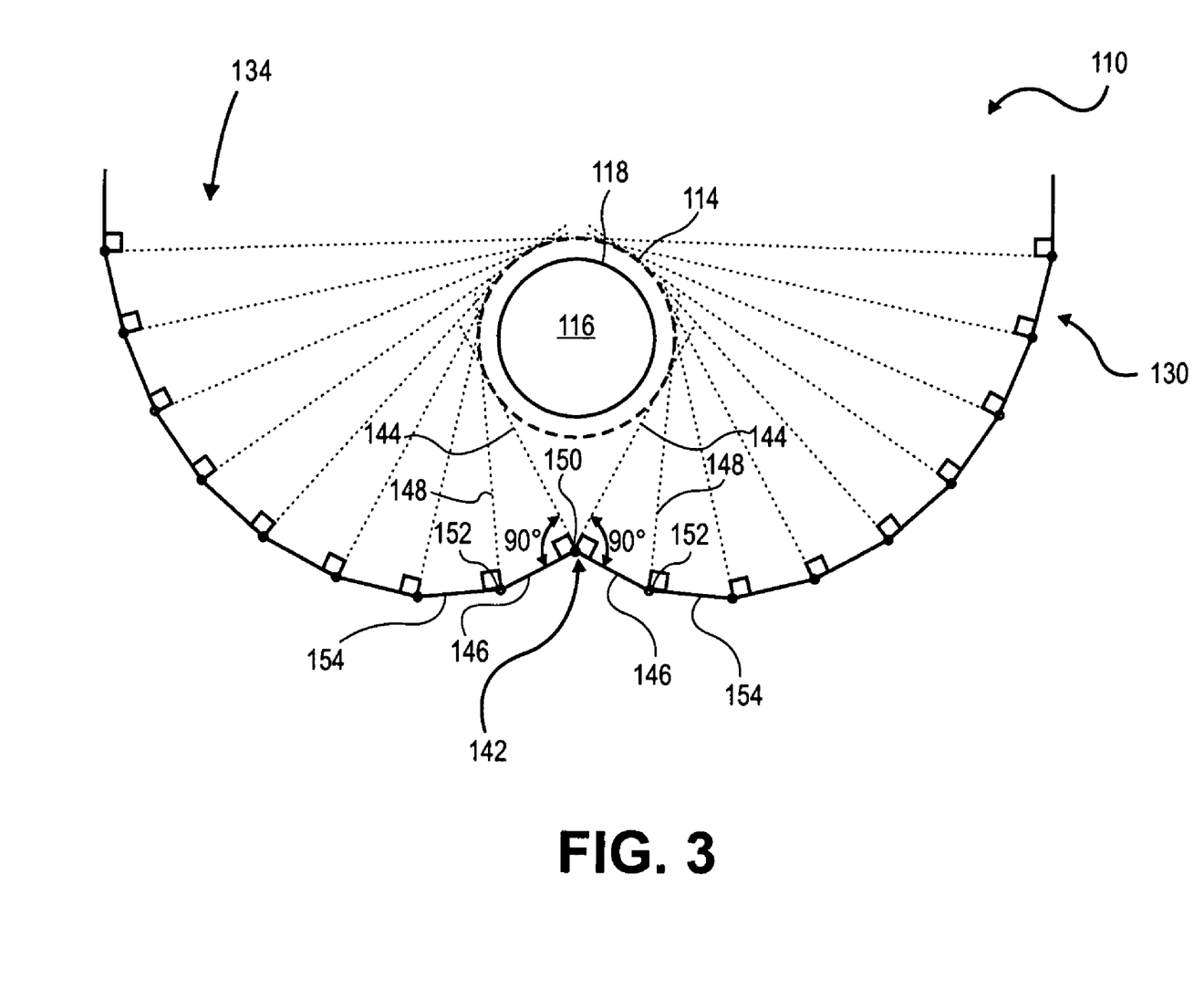
FIG. 3 is a cross-sectional view perpendicular to line II-II of FIG. 1 with portions removed for clarity.

FIG. 3 is a cross-sectional view perpendicular to line II-II of FIG. 1 with first reflector portions 120 removed for clarity. As shown in FIG. 3, the following exemplary process can generate the curvature of the 2D mirrors of one or more of the first reflector portion. Starting from a cusp point 142 directly below the lamp 116, two reference lines 144 are constructed in a plane normal to the longitudinal axis 112. Each of these lines 144 is tangent to the lamp region 114 and extends from the cusp point 142 through a tangent point on the lamp region 114. The two resulting tangent lines 144 diverge from each other thereby form a V shape.

Two initial planar 2D mirror facets 146, each normal to a respective tangent reference line 144, extend for short distances (corresponding to their facet widths) in a direction away from the lamp 116 from a first edge 150 extending parallel to the longitudinal axis 112 and intersecting the cusp point 142 to a second edge 152 extending parallel to the lamp axis. The second edge 152 of each of these two mirror facets 146 forms a new point of intersection with a plane normal to the longitudinal axis 112.

Two new tangent reference lines 148 may be constructed to the lamp surface 118 in the same manner as described above, that is, one from each newly formed reference point formed by the respective second edge 152. Then, two new incremental mirror facets 154 may be constructed in the same manner as described above, i.e., one from each newly formed reference point, and with each new mirror facet 154 forming a right angle with a corresponding reference line 148 tangent to the lamp region 114.

This facet construction process may be continued until each mirror facet extends to the top of the lamp surface, or slightly above it. As is evident from FIG. 3, which illustrates this facet construction geometry, substantially no light rays projected from the lamp 116 can be reflected back to the lamp surface 118 before exiting the opening 134 of the second reflector portion 130. Avoiding reflections back to the lamp also avoids heat build-up owing to light absorption by the lamp phosphor. Accordingly, the lamp remains cooler and thereby lengthens lamp life.

Facet widths of finite size generate faceted mirrors. The widths can all be of equal size or their sizes may vary. Alternatively, the facet widths can all be infinitesimally small. A mirror surface generated when the widths of all of its facets approach zero will appear smooth rather than faceted. The overall mirror size increases with the number and size of its facets. Accordingly, the size of a substantially smooth mirror with infinitesimally small facet widths may be minimal.

It should be appreciated that the lamp region 114 should be used for this construction process instead of the lamp 116. The cross-sectional area of the lamp region 114 may be larger than that of the lamp 116 it encloses. The size and position of the lamp region 114 can be selected to accommodate manufacture and alignment errors of the lamp and the first reflector portion and to ensure that the lamp surface 118 does not protrude through the lamp region 114. Accordingly, the previously described mirror construction process is carried out as if the lamp region 114 were the actual lamp surface 118.

The general process described with respect to FIG. 3 used to generate the "wrap around" 2D curved mirrors of the second reflector portions 130 may also be used to generate the 2D curves of the first section 160 of the first reflector portion 120. The construction of the first reflective section 160 may be similar to the construction illustrated in FIG. 3 for the second reflector portion, except that there is no cusp and the construction procedure must be inverted for down-light projections. As shown in FIG. 2, a virtual square may be circumscribed about the lamp region 114. Starting reference points for generating mirror facets, which are located at a corner of this virtual square, ensure that no view from the lamp region to the backsides of the curved mirrors can exist. Thus, backside exposure can be prevented.

The virtual square can be rotated about a longitudinal axis of the lamp 116 to create the locus of all possible corner starting reference points. Accordingly, as shown in FIG. 2, the circle circumscribed about the virtual square describes this locus of starting points. The backsides of mirror facets generated from starting points inside this circle may have a direct view of the lamp surface 118 and thereby be exposed to light flux from that surface. Backsides of mirror facets generated from starting points on or outside of this circle can have no direct view of the lamp surface 118 and cannot be exposed to light flux from that surface.

It may be desired to avoid exposing the backsides of 2D curved mirrors to light flux from the lamp surface 118 if these backsides are not mirrored. In such a case, the backsides would absorb and/or scatter any light flux they intercept, which would have an adverse effect upon luminaire efficiency.

Alternatively, if the backsides were mirrored, they could prevent light rays from being reflected by the mirror surfaces engineered to reflect light upward or downward and, thereby, contribute efficiently to either the up-light or the down-light flux. However, mirrored backsides may reflect the light flux they intercept in unwanted directions that would cause an excess of multiple reflections before exiting the up-light or the down-light output ports; or they may become absorbed or scattered. Light ejected from output ports after undergoing excessive multiple reflections is attenuated at each reflection, which can thereby cause an excessive reduction in efficiency.

Figure 4:
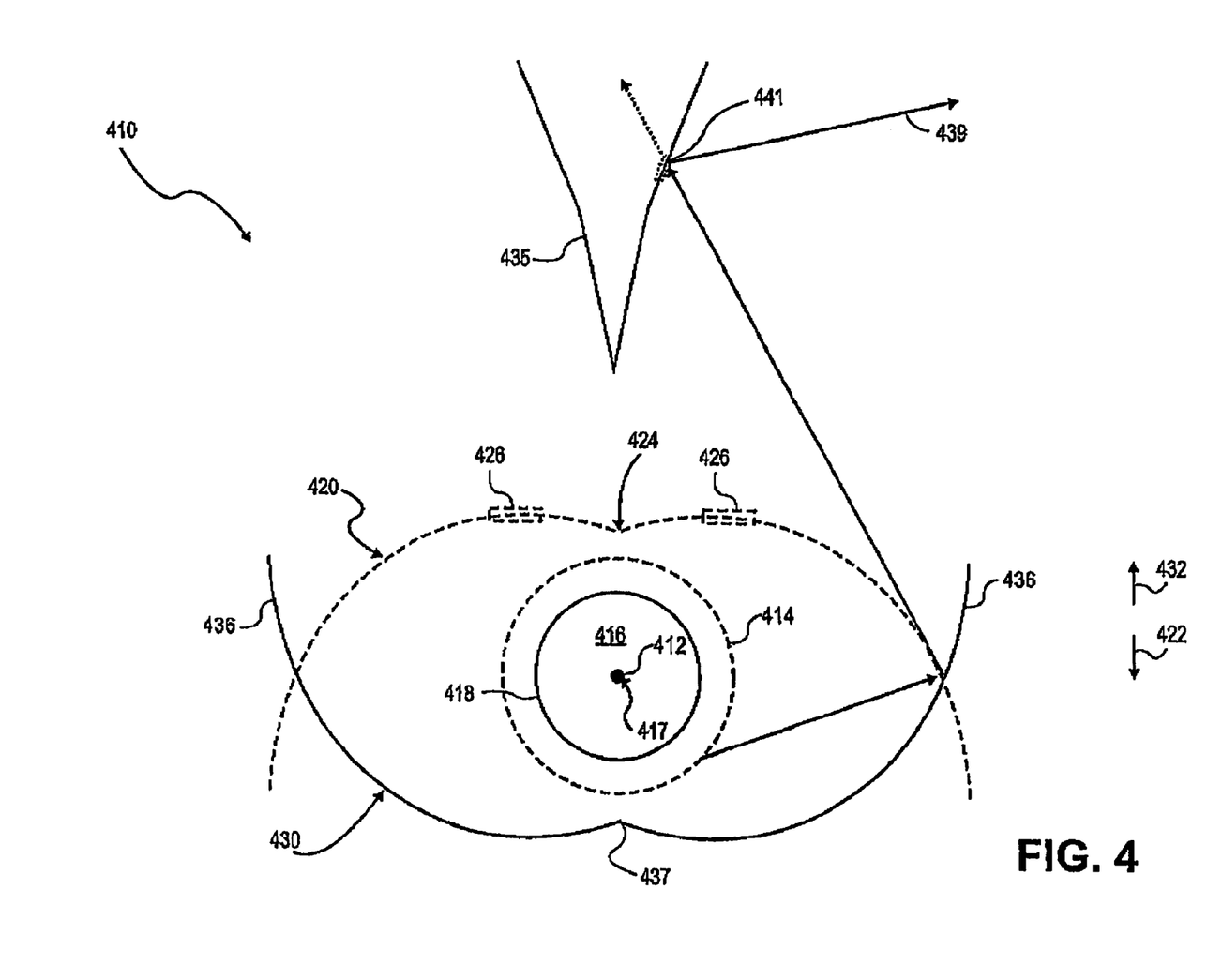
FIG. 4 is a cross-sectional view similar to FIG. 2 illustrating exemplary aspects of the invention.

Referring now to FIG. 4, according to various aspects, an exemplary luminaire 410 may include a first reflector portion 420 (e.g., a down-light mirror cavity with respect to a ceiling mounted luminaire) and a second reflector portion 430 (e.g., an up-light mirror cavity with respect to a ceiling mounted luminaire). The luminaire 410 has a longitudinal axis 412 and a region 414 configured to contain a lamp 416, for example, a tubular, cylindrical fluorescent lamp, having a lamp axis 417. The lamp region 414 extends longitudinally along the longitudinal axis 412 of the luminaire 410. The lamp region 414 may also be referred to as a lamp clearance envelope. The lamp region 414 comprises an area slightly larger than a cross-sectional area of the lamp 416, so as to account for alignment or manufacturing tolerances.

The first reflector portion 420 may be configured to direct light rays in a first direction 422 substantially perpendicular to the longitudinal axis 412 of the luminaire 410. For example, each of the first reflector portions 420 may comprise a down-light reflector for directing light toward a floor of a room or area. Similar to the embodiment shown in FIG. 1, a plurality of first reflector portions 420 may be arranged in an array extending along the longitudinal axis 412 of the luminaire 410. The array of first reflector portions 420 may be substantially linearly and contiguously arranged above the lamp 416 (with respect to a ceiling mounted luminaire 410) and may be oriented along a line parallel to the lamp 416 and span the length of the lamp 416.

The second reflector portion 430 may be configured to direct light rays in a second direction 432 substantially opposite to the first direction 422. For example, each of the second reflector portions 430 may comprise an up-light reflector for directing light toward a ceiling of a room or area. Similar to the embodiment shown in FIG. 1, a plurality of second reflector portions 430 may be arranged in an array extending along the longitudinal axis 412 of the luminaire 410. The array of second reflector portions 430 may be substantially linearly arranged along and below the lamp 416 (with respect to a ceiling mounted luminaire 410), spanning the length of the lamp 416. The second reflector portions 430 may comprise two opposing two-dimensional (2D) curved mirrors 436 having curvature in planes normal to the longitudinal axis 412 and no curvature in planes parallel to the longitudinal axis 412. The curved mirrors 436 may extend partially around the lamp 416.

One or more of the second reflector portions 430 may include a reflector member 435 in a path of a portion of the light rays being directed in the second direction 432. The reflector member 435 may be configured to alter the path of the portion of light rays being directed in the second direction 432. The reflector member 435 may be structured and arranged to distribute light in a batwing shape. For example, the reflector member 435 may comprise a v-shaped reflector disposed above the lamp 416 (with respect to a ceiling mounted luminaire) opposite to a cusp 437 of the curved mirrors 436. As a result, light rays reflected from the curved mirrors 436 in the second direction 432 can be distributed in a direction 439 laterally outward from the longitudinal axis 412 of the luminaire 410, while a directional component of the light rays remains in the second direction 432. Such a distribution of light may be referred to as a batwing distribution. Since a batwing distribution provides more up-light further out from the luminaires, a plurality of luminaires can be spaced further apart in a given room or area, thereby reducing the number of luminaires required to sufficiently illuminate the given room or area.

As shown in FIG. 4, one or more of the first reflector portions 420 may comprise 2D curved mirrors that wrap around and cover the top of the lamp 416 (with respect to a ceiling mounted luminaire), thereby creating an inverted version of the second reflector portion 430. Thus, both of the first and second reflector portions 420, 430 may be constructed by the process described above with respect to FIG. 3. With the absence of an opening at the top of the first reflector portion, it is no longer possible for light from the lamp to be incident on the backsides of the curved mirrors. Accordingly, it is no longer necessary for the two merged starting reference points of its 2D curved mirrors to be at or outside of the circle circumscribed about corners of the virtual square. It is only required that a cusp point 424 be at a reasonable distance outside of the lamp region 414.

It should be appreciated that the first reflector portions 420 may comprise a single reflective section, two reflective sections, as described in U.S. patent application Ser. No. 10/366,337, or three reflective sections, as discussed above with respect to FIG. 2.

According to various aspects, one or more of the first reflector portions 420 may include a perforation 426 (shown in shadow in FIG. 4) substantially at a highest peak (with respect to a ceiling mounted luminaire). The perforation 426 would add some up-light to a corresponding region of the ceiling.

In accordance with various aspects, the reflector member 435 may include one or more perforations 441 for allowing light to travel through the reflector member 435 to the ceiling in a more vertical direction, rather than being directed to the ceiling in the laterally outward direction 439. As a result, the perforations 441 may be used to modify the batwing distribution to achieve a desired result.

Figure 5:
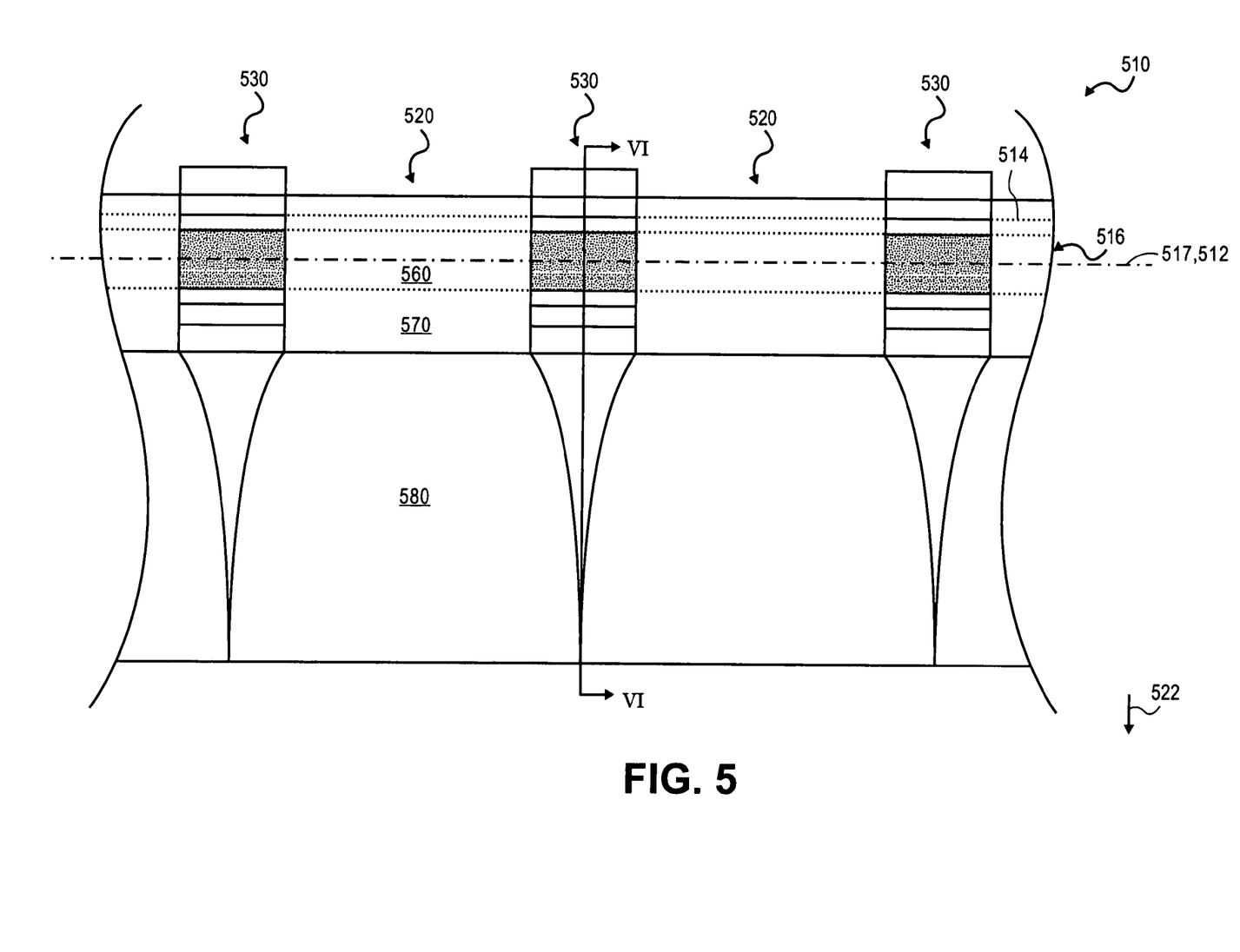
FIG. 5 is a side plan view of an exemplary luminaire in accordance with various aspects of the invention.
Figure 6:
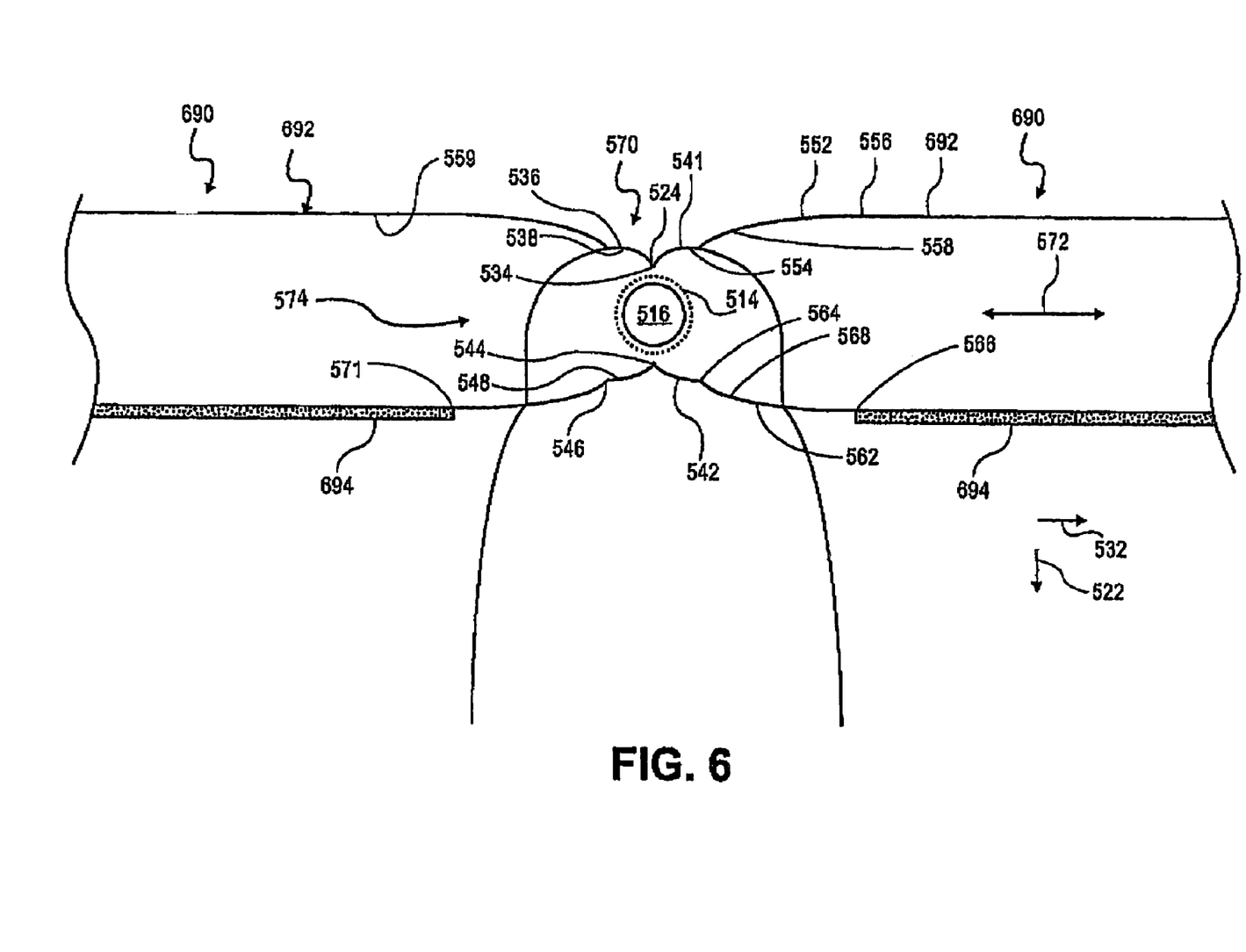
FIG. 6 is a cross-sectional view along line VI-VI of FIG. 5 illustrating an exemplary waveguide in accordance with aspects of the invention.

Referring now to FIGS. 5 and 6, according to various aspects, an exemplary luminaire 510 may include a first reflector portion 520 (e.g., a down-light mirror cavity with respect to a ceiling mounted luminaire) and a second reflector portion 530 (e.g., a side-light mirror cavity with respect to a ceiling mounted luminaire). The luminaire 510 has a longitudinal axis 512 and a region 514 configured to contain a lamp 516, for example, a tubular, cylindrical fluorescent lamp, having a lamp axis 517. The lamp region 514 extends longitudinally along the longitudinal axis 512 of the luminaire 510. The lamp region 514 may also be referred to as a lamp clearance envelope. The lamp region 514 comprises an area slightly larger than a cross-sectional area of the lamp 516, so as to account for alignment or manufacturing tolerances.

The first reflector portion 520 may be configured to direct light rays in a first direction 522 substantially perpendicular to the longitudinal axis 512 of the luminaire 510. For example, each of the first reflector portions 520 may comprise a down-light reflector for directing light toward a floor of a room or area. As shown in FIG. 5, a plurality of first reflector portions 520 may be arranged in an array extending along the longitudinal axis 512 of the luminaire 510. The array of first reflector portions 520 may be substantially linearly and contiguously arranged above the lamp 516 (with respect to a ceiling mounted luminaire 510) and may be oriented along a line parallel to the lamp 516 and span the length of the lamp 516.

The second reflector portion 530 may be configured to direct light rays in a second direction 532 having a directional component substantially perpendicular to the first direction 522. For example, each of the second reflector portions 530 may comprise a side-light reflector for directing light laterally outward from longitudinal axis 512 and toward a ceiling of a room or area. As shown in FIG. 5, a plurality of second reflector portions 530 may be arranged in an array extending along the longitudinal axis 512 of the luminaire 510. The array of second reflector portions 530 may be substantially linearly arranged along and spanning the length of the lamp 516.

As shown in FIG. 6, one or more of the first reflector portions 520 may comprise 2D curved mirrors that wrap around and cover the top of the lamp 516 (with respect to a ceiling mounted luminaire), thereby creating an inverted version of the second reflector portion 530. Thus, the first reflector portion 520 may be constructed by the process described above with respect to FIG. 3. With the absence of an opening at the top of the first reflector portion, it is no longer possible for light from the lamp to be incident on the backsides of the curved mirrors. Accordingly, it is no longer necessary for the two merged starting reference points of its 2D curved mirrors to be at or outside of the circle circumscribed about corners of the virtual square. It is only required that a cusp point 524 be at a reasonable distance outside of the lamp region 514. According to various aspects, one or more of the first reflector portions 520 (as also shown in FIG. 5) may comprise three reflective sections 560, 570, 580 similar to reflective sections 460, 470, 480, respectively, described above with respect to FIG. 4.

The second reflector portion 530 may include a first curved reflector 541 and a second curved reflector 542, both extending substantially perpendicular to the first reflector portion 520. The first and second curved reflectors 541, 542 may comprise, for example, cusp mirrors. The first curved reflector 541 may be between the lamp 516 and a ceiling, and the light source 516 may be between the second curved reflector 542 and the ceiling. The first curved reflector 541 may have a first end 534, a second end 536, and a surface 538, and the second curved reflector 542 may have a first end 544, a second end 546, and a surface 548. The surfaces 538, 548 of the first and second curved reflectors 541, 542 may be facing one another on opposite sides of the lamp 416.

The second reflector portion 530 shown in FIG. 5 may also include a third curved reflector 552 and a fourth curved reflector 562 disposed on opposite sides of the lamp 516. The third and fourth curved reflectors 552, 562 may comprise a compound parabolic concentrator (CPC) having a CPC exit port 574 along a CPC axis 572. The third curved reflector 552 has a first end 554, a second end 556, and a surface 558, and the fourth curved reflector 562 has a first end 564, a second end 566, and a surface 568. The first ends 554, 564 of the third and fourth reflectors may be connected with the second ends 536, 546, respectively of the first and second curved reflectors 541, 542, and the surfaces 558, 568 of the third and fourth curved reflectors may face one another.

The arrangement of luminaire 510 may provide a low-profile structure while still achieving desired lighting characteristics. As shown in FIG. 5, the luminaire 510 may have contiguous down-light hollow mirror cavities. The contiguous arrangement may provide the maximum downlight flux. In various aspects, the above geometry may be scaled around a small diameter linear lamp, for example, a T4 linear fluorescent lamp (available from Zhongshan Guzhen Guangcal Lighting Appliances Factory, 13 Wenge Road, Gangnan, Guzhen Town, Zhongshan City, Guangdon Province, China; website: http://www.aokete.com). Alternate linear lamp geometries can also be fabricated with LEDs, side emitting optical fibers, solid/hollow light pipes, and the like, as is know to those skilled in the art.

Referring to FIG. 6, waveguides 690 may be added to the luminaire 510, which may improve the luminance uniformity of the ceiling. The waveguide 690 may span the array of side-facing mirror cavity exit port apertures with two planar surfaces 692, 694. One surface 692 may be a ceiling, for example, a glossy white ceiling, above the array. The other surface 694 may be a perforated specular mirror below the array and parallel to the ceiling. The perforated mirror may have a variable perforation density engineered to provide uniform ceiling illuminance. Perforations (not shown) may be a halftone pattern or a pattern of slots. The perforations may be fine enough to be unresolvable by the human eye to avoid bing a source of glare.

To improve the luminance uniformity of the ceiling, a diffuser may be adjacent to and below the bottom of the waveguide 690 to control the directional characteristics of light rays passing through the mirror perforations. Specular light rays reflected from the ceiling or from the first, second, third and/or fourth reflectors 541, 542, 552, 562, and similarly from reflectors 538, 548, 559, and 569 may be visible only over a small range of viewing angles after passing through the perforated mirror. Viewing specularly reflected light, which propagates over a small range of viewing angles, may be undesirable. Further, light from the perforated mirror projected downward over a small range of angles may cause the ceiling to appear dark for most viewing angles and disproportionately bright for viewing angles with a small specular range. Accordingly, a diffuser may be placed adjacent to the perforated mirror to spread the specular light transmitted through the perforated mirror over a desirable larger range of viewing angles. However, as used herein, the term "diffuser" includes any component that alters the directional characteristics of light entering the diffuser so that the light possesses different and more desirable directional characteristics upon exiting the diffuser.

The top edges of the side-facing mirrors 552 and 559 may be positioned against a ceiling. The perforated specular mirrors and the diffusers below them may extend from the bottom edges 566 and 571 of the side facing mirrors to the walls. The diffusers may span the areas of the adjacent perforated mirrors.

Figure 7:
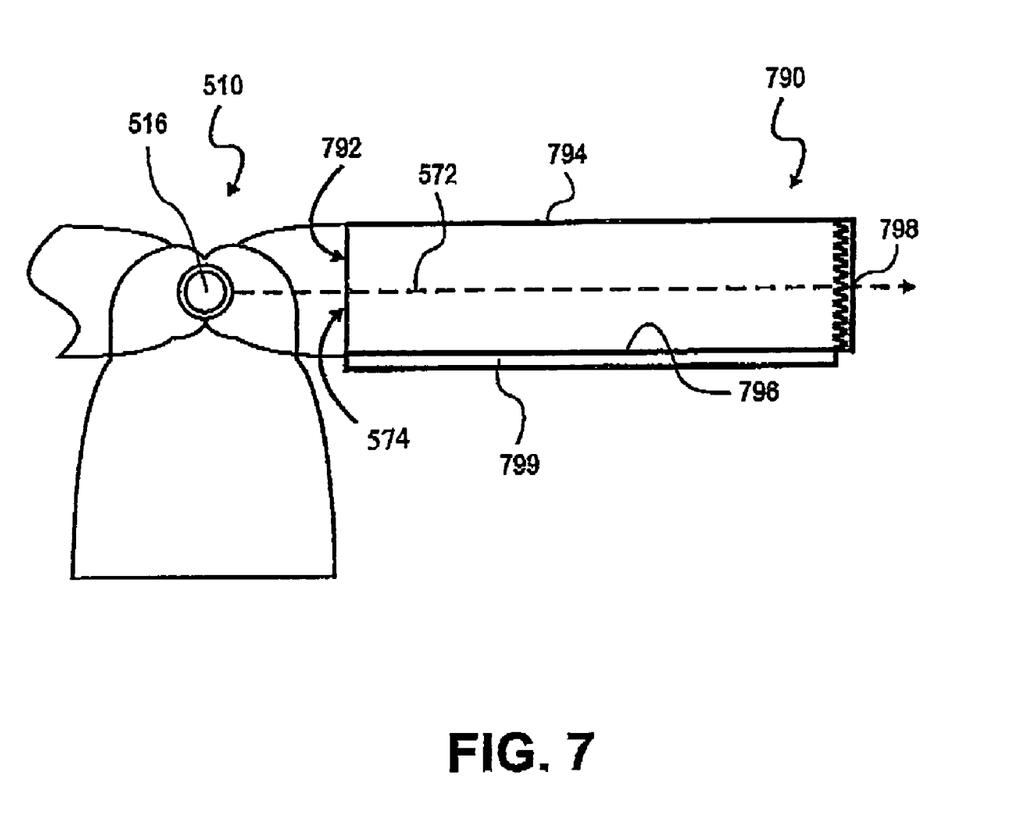
FIG. 7 is cross-sectional view of a lighting assembly in accordance with aspects of the invention.

Referring now to FIG. 7, according to various aspects, a waveguide 790 may have an entrance port 792 adjacent to and spanning an array of side-facing exits ports 574. The waveguide 790 may include a top specular mirror 794, a bottom TIR film component 796 oriented parallel to the top specular mirror 794, and a specular BEF-like structure 798 positioned adjacent to the side-facing exit port array and normal to the bottom TIR film 796 and the top specular mirror 794. An optional light diffuser 799 can be inserted adjacent to and below the TIR film 796.

In operation, light exiting the side-facing exit port projects into the waveguide entrance port over a range of angles (.+−.55 degrees from the side-facing axis 572, for example). The projected light falls on the specular mirror 794, the TIR film 796, and the BEF-like mirror structure 798. The specular mirror 794 reflects light downward to the TIR film 796 or outward to the BEF-like mirror structure 798. The TIR film reflects incident light within 28 degrees from the side-facing axis 572 and transmits incident light between 29 degrees and 55 degrees from the side-facing axis 572. The BEF-like mirror structure 798 converts light incident on it at angels within .+−.28 degrees from the side-facing axis 572 into upward-propagating and downward-propagating lobes spanning the angular regions from −29 degrees to −55 degrees and from +29 degrees to +55 degrees from the side-facing axis 572. These lobes propagate backward through the hollow light guide toward the side-facing exit port 574, reflecting from the top specular mirror 794 and transmitting through the bottom TIR film 796. If the optional diffuser 799 is present, the diffuser 799 may convert the angular characteristics of the light transmitted by the TIR film 796 into a different and/or more desirable angular distribution. The operation of TIR film is well known, as exemplified by U.S. Pat. No. 4,615,579.

It should be appreciated that if a longer waveguide is desired, the BEF-like mirror can be replaced with a transmissive BEF-like structure followed by an additional waveguide section. The lobes may then be extracted over the length of the added section.

Figure 8:
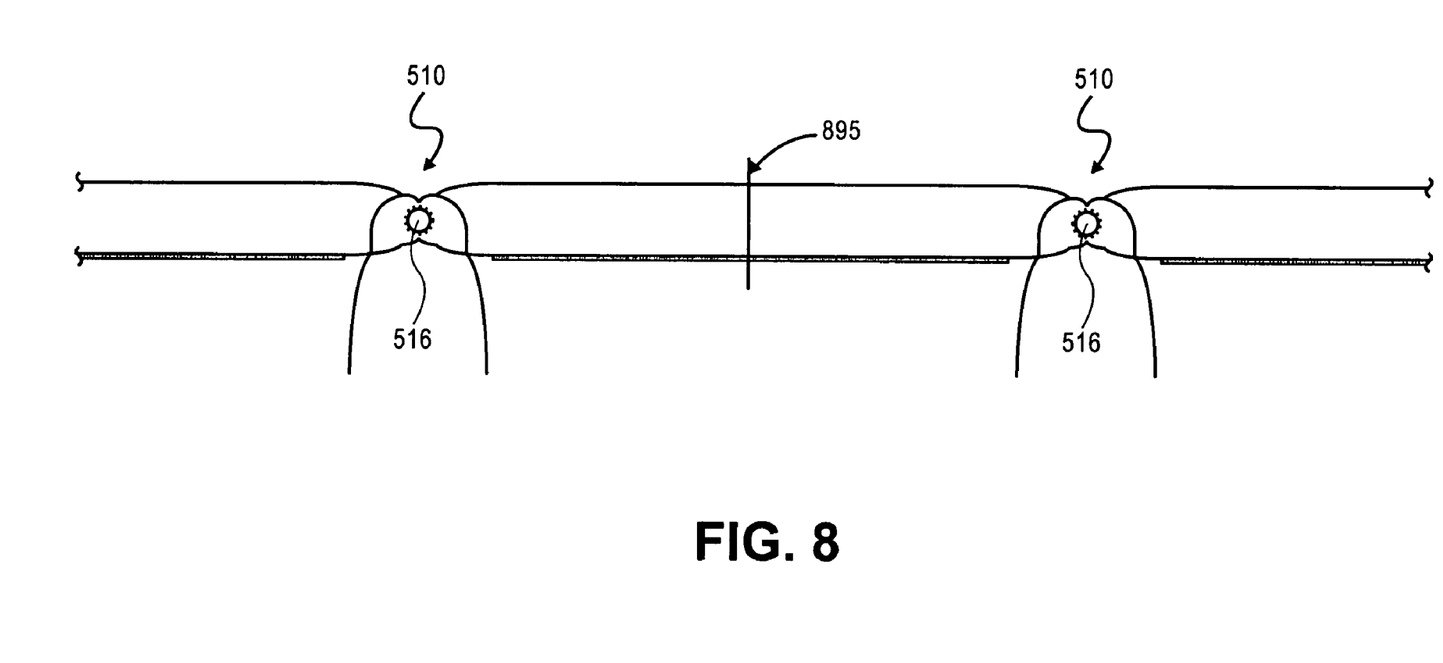
FIG. 8 is a cross-sectional view along line VI-VI of FIG. 5 illustrating another exemplary waveguide in accordance with aspects of the invention.

FIG. 8 shows how a plurality of luminaires 510 can be arranged in a plurality of rows. The variable perforation density of the perforated mirrors of this exemplary embodiment may be engineered to provide a desired ceiling luminance. For example, if a uniform ceiling luminance is desired, perforation densities may increase with distance from each lamp 516 until substantially the midpoint 895 between the two lamps 516.

The pattern of mirror perforations can be applied to a mirror surface on a refractive substrate made of a transparent glass or polymer material, or they can be applied to a mirror surface on a thin polymer sheet that may be bonded to a clear substrate.

In various aspects, the diffuser can be internally distributed over the volume of a glass or polymer substrate, or the diffuser can be a thin film applied to the surface of a refractive substance made of a transparent glass or polymer material. In the latter case, a thin film of mirror perforations can also be applied to the substrate. Diffusers of various types are known to those skilled in the art, such as volume holograms, surface holograms, binary optical elements, substrates with imbedded scattering particles, micro-optics, and various combination hybrids of these types.

It should be appreciated that the top and bottom surfaces of the exemplary waveguides described herein may extend the full length of the array, or past the array to the room walls, in directions parallel to the lamp axis. Accordingly, these waveguides may be devoid of side panels normal to the lamp axis. Alternative embodiments of these waveguides can be configured with mirrored side panels normal to the lamp axis. The positions of these side panels can be aligned with the edges of the array elements of the second reflector portion 530 to form an array of waveguide compartments. An additional design option is to make the compartment widths (in the lamp axis direction) wider than that of the side facing exit ports 570 ports 574.

In exemplary embodiments where the lamp is completely surrounded by up-light and down-light mirrors, it may become difficult to insert the lamp into its receptacles from above in the usual manner. Because insertion from below is difficult, it may be desirable to insert the lamp from the direction of its axis (that is, from the side end panel of the luminaire). This becomes problematic for long lamps and requires a method of removing the pin receptacles from the end of at least one of the lamps and then re-installing and re-securing the pin receptacles after the lamp has been inserted.

If the luminaire embodiment with "wrap around" of the 2D curved mirrors of the down-light mirror cavities was suspended by cables, then adjustable clamps or cable grippers could be employed to facilitate maintenance. Such devices are sold by Cable Grippers Inc (Las Vegas, Nev.). By using these cable grippers, a maintenance person could use a ladder to gain access to one side of the fixture. This would facilitate loosening the gripper on that side so the luminaire tilts-down below the level of the other luminaires, replacing the lamp (perhaps by first sliding-open an access door), and then raising the luminaire and re-tightening the gripper. This method requires no tools.

Even with the end panel access problem solved, it may be difficult to guide long fluorescent lamps through one end panel, through the lamp clearance holes in the mirrored partitions normal to the lamp axis, and into the pin receptacles at the other end panel. An example of such pin receptacles is available from Leviton Mfg. Company Inc. (Little Neck, N.Y.), called Snap-In, Quickwire Medium Bi-Pin Fluorescent Lampholders for T-8 and T-12 Lamps. This "threading the needle" process can scrape the surface of the lamp on the partition holes thereby damaging the lamp surface and/or the edges of the partition holes. To facilitate the lamp insertion process, the partitions can be fabricated of a soft material, such as a polymer with specular coatings on opposing planar faces. Alternatively, metallic spacers can be fabricated comprising holes that are Teflon-coated or equipped with Teflon inserts to prevent scraping-induced damage to the hole edges or to the lamp surface. Instead of Teflon, alternative slippery, low friction materials can also be used. Partition hole inserts could be given a conical surface shape facing the direction from which the lamp is inserted to facilitate guiding the lamp.

Alternatively, a conical end tip (which could also be made of, or coated with, Teflon (or another material of similar function) could be pressed on to the inserted end of the lamp. This end tip could facilitate guiding the lamp through the Teflon-coated partition holes. For this lamp insertion means, it will be necessary to access both luminaire end panels because it will be necessary to remove the conical lamp end tip when it protrudes from the end of the luminaire opposite the lamp insertion. The "cable gripper" can be used to facilitate access to both luminaire end panels. Accordingly, the lamp pin socket needs to be removed opposite end prior to lamp insertion and must be installed back on to the lamp after lamp insertion.

For another lamp installation means through luminaire end panel, a hollow cylindrical lamp alignment installation tube can be used. The thickness of this tube would nearly fill the gaps between the installed lamp and the partition holes. The tube could be made of, or coated with, Teflon (or with a low friction material of similar function). The insertion end of the tube wall could be given a conical shape to facilitate its ease of passage through the Teflon-coated partition walls. After insertion of this tube, the lamp could pass through its hollow center and be installed into the electrical pin socket at the opposite end of the luminaire. Then the installation tube can be removed and the electrical pin socket can be installed on to the protruding end of the lamp. Finally, the luminaire can be hoisted up into position and its supporting cables can be installed.

A disadvantage of using Teflon inserts or coatings on the partition walls is that they will scatter and absorb light thereby lowering the luminaire efficiency. An alternative embodiment that avoids this efficiency loss uses a hollow cylindrical lamp alignment installation tube that can be installed on the outside of the lamp end panel rather than slipping into the luminaire and through its partition holes. During the luminaire fabrication process, the holding bracket for this installation tube can be aligned to the end panel so that tube's axis is brought into alignment with the axis of the installed fluorescent lamp. This can be done by pressing into the installation tube a telescopic sight with a cylindrical housing that fits the cylindrical inside diameter of the installation tube. By sighting the pin sockets on the opposite end of the luminaire, the alignment tube bracket can be adjusted to align the alignment tube bore with the pin sockets. After securing the alignment tube bracket in that aligned position, the telescopic sight can be removed and a fluorescent lamp can then be inserted through the alignment tube to test its ability to engage the electrical pin socket on the opposite end of the luminaire. Then the alignment tube can be removed from its bracket and an electrical pin socket can be installed on to the protruding end of the lamp.

The alignment tube inside diameter needs to be a close fit to the outside diameter of the lamp. The telescopic sight needs to have focusing ability because, upon its initial installation into its mounting bracket, it may be too far out of alignment with the lamp pin receptacle on the opposite end of the luminaire. It will then need to be focused on the partition holes to provide a means for guiding the bracket alignment process.

The alignment tube length need not be as long as the fluorescent lamp. For example, for a 48 inch long lamp, the alignment tube could be two or three feet long.

In another embodiment, a unique luminaire construction can be configured that allows installation of the lamp from the top in the usual manner. Such a luminaire embodiment could have a transparent top cover element that is hinged to the outside surface of the up-light mirror cavity, which spans the length of the lamp. The hinges allow the cover to fold back and thereby expose the up-light mirror cavity. In addition, it becomes necessary to attach the top cusped surfaces of the down-light mirrors to the transparent top cover element so that a top portion of all the down-light mirrors can fold back with the cover element. This requires a unique embodiment of the down-light mirrors capable of separating a portion of all of their top sections from their bottom sections when the cover is folded back. Then, after the lamp has been installed in the usual manner and the top cover is folded forward, the down-light mirror top sections must be able to re-engage their bottom sections accurately. To ensure accurate engagement of the top and bottom sections, the alignment of these sections should be adjusted during the luminaire fabrication process prior to the installation of the transparent top cover and its hinges. After alignment is verified, the top cover can be secured to the top cusped surfaces of the down-light mirrors and then the hinges can be secured to the top cover and the outside of the luminaire. These securing operations must be conducted without disturbing the aligned positions of the upper and lower sections of the down-light reflectors.

An added advantage of the top cover is that it can considerably retard the build-up of dust within the luminaire. Also, the accumulation of dust on the cover's top surface is easily cleaned when the lamp is replaced. Further, by folding back the down-light mirror's top section, it makes cleaning the interior surfaces of the luminaire easier.

The very high efficiency of this luminaire increases the efficiency degradation owing to dust and other contaminants. This increases the importance of maintaining cleanliness.

The down side of implementing a transparent top cover is the efficiency losses caused by Fresnel reflections of up-light flux from the top cover surfaces. This amounts to an efficiency reduction of about eight percent for up-light flux. Since the down-light flux can be made nearly equal to the up-light flux when there is no top cover, the Fresnel reflection induced efficiency loss for the overall combined up-light and down-light efficiency is approximately 4 percent.

Modeling and simulation studies indicate that the preceding embodiment projects no luminaces that violate the glare reduction requirements of DIN Specification 5035 for Artificial Lighting. The exemplary embodiments of this disclosure assume that maximum light ray exit angle from the lamp's glass tube is 90 degrees from the tube cylinder's normal at the ray exit point from the tube. However, it may be possible for the maximum angle to be less than 90 degrees if the phosphor and glass media have low scatter properties, low variability in their refractive indices, and suitable refractive index values. However, in most cases it is likely that there will be some degree of scatter within the phosphor and within the glass tube. Accordingly, the 90-degree maximum assumption is conservative. It may be advantageous for the maximum exit angle from normal to be less than 90 degrees, because a small divergence of rays from points on the glass tube may be more controllable and may therefore make it possible for the up-light and down-light hollow mirror cavities to be made more compact.

It should be appreciated that an exemplary cylindrical fluorescent lamp for use in various aspects of the invention is well known by one skilled in the art. In response to a high voltage applied across the length of a glass tube enclosure, it is well known that the gases contained in the tube emit UV light. A phosphor coating on the interior surface of the glass tube emits visible light by fluorescing in response to excitation by the UV light.

In general, depending on the properties of the phosphor medium and the fluorescent material imbedded in it, the rays generated by fluorescence can be absorbed, scattered, and/or transmitted. For best performance, a phosphor coating will have a high conversion efficiency of UV light to fluorescent light and low absorption and scattering of fluorescent light, which accompanies high transmittance.

As referenced previously, lamps other than of the tubular fluorescent variety can also be utilized with the embodiments discussed herein. For example, LEDs and CMH lamps are increasing in popularity. These devices can be positioned in the vicinity of where the fluorescent lamp is shown in the various embodiments discussed herein (position optimized via ray tracing, for example). In the case of a high power CMH lamp or an array of high power LEDs, a single reflector arrangement is contemplated. Alternatively, a linear or arcuate arrangement of such devices can be constructed with a corresponded array of reflectors. CMH lamps are manufactured by Philips and General Electric. High power LEDs are manufactured by Lumileds (San Jose, Calif.), Cree (Durham, N.C.), and Nichia (Tokushima, Japan), and high power arrays are available from Lamina Ceramics (Westampton, N.J.) and Norlux (Carol Stream, Ill.).

It should be appreciated that the hollow collimators described above with respect to the exemplary embodiments can be replaced with solid collimators that utilize total internal reflection. Alternatively, the collimators can be hollow over some portions and solid over other portions. Moreover, it should be appreciated that the reflectors can be fabricated from multilayer films, such as 3M's Vikuiti™ Enhanced Specular Reflector (ESR).

For any of the embodiments, it is contemplated that an optical/electrical feedback mechanism would be utilized to regulate the light output, both the average level, and from lamp-to-lamp, either within the luminaire or between luminaires. These feedback techniques, as is known in the art, can compensate for lamp temperature, lamp ageing, dirt depreciation, color adjustments, and others known in the art. In addition, unique lamp driving/feedback arrangements are contemplated, such as those referenced in the patents and/or incorporated in the products of Color Kinetics (Boston, Mass.) and the like.

The novel features of the present invention will become apparent to those of skill in the art upon examination of the disclosure or can be learned by practice of the present invention. It should be understood, however, that the detailed description of the invention and the specific examples presented, while indicating certain embodiments of the present invention, are provided for illustration purposes only, because various changes and modifications will become apparent to those of skill in the art from this disclosure.

What is claimed is:

1. A luminaire comprising:
an elongated light source being operable to emit light rays;
a region configured to contain the light source, the region extending longitudinally along the longitudinal axis of the luminaire;
a first reflector portion configured to direct light rays emitted from the light source in a first direction substantially perpendicular to a longitudinal axis of the luminaire, the first reflector portion comprising:
a first pair of curved reflectors each having a first end, a second end, and a surface, the first ends being connected to one another, the first pair of curved reflectors being disposed on opposite sides of the region, and the surfaces of the first pair of curved reflectors facing one another;
a hollow member having a first end and a second end, the first end being connected to the second ends of the first pair of curved reflectors; and
a plurality of additional curved reflectors each having a first end, a second end, and a surface, each of the first ends of the additional curved reflectors being connected with the second end of the hollow member; and
a second reflector portion disposed along the longitudinal axis, the second reflector portion being configured to direct the light rays directed by the first reflector in a second direction away from the longitudinal axis, the second direction being normal to the longitudinal axis and the first direction.

2. The luminaire of claim 1, wherein the second reflector portion comprises:
a first pair of curved reflectors each having a first end, a second end, and a surface, the first ends being spaced from one another on opposite sides of said region, the first pair of curved reflectors being disposed on opposite sides of said region, and the surfaces of the first pair of curved reflectors facing one another.

3. The luminaire of claim 2, wherein the second reflector portion further comprises:
a second pair of curved reflectors each having a first end, a second end, and a surface, each of the first ends of the second pair of reflectors being connected with one of the second ends of the first pair of reflectors, the second pair of curved reflectors being disposed on opposite sides of said region, and the surfaces of the second pair of curved reflectors facing one another.

4. The luminaire of claim 1, wherein the plurality of additional curved reflectors comprises four additional curved reflectors arranged in two pairs such that the surfaces of each pair face one another.

5. The luminaire of claim 1, further comprising a waveguide coupled with the second reflector portion, the waveguide being configured to direct light rays in the second direction and in a third direction, the third direction being opposite to the first direction.

6. The luminaire of claim 1, further comprising a plurality of first reflector portions and a plurality of second reflector portions, the plurality of first reflector portions and the plurality of second reflector portions being disposed alternately along the longitudinal axis of the light source.

7. A lighting assembly configured to be mounted to a ceiling, comprising:
an elongated light source having a longitudinal axis and being operable to emit light rays;
a first reflector portion between the light source and the ceiling, the first reflector portion being configured to direct light rays from the light source in a first direction away from the ceiling; and
a second reflector portion disposed along the longitudinal axis, the second reflector portion being configured to direct the light rays directed by the first reflector in a second direction away from the longitudinal axis, the second direction being substantially parallel with the ceiling and normal to the longitudinal axis, the second reflector portion comprising a first curved reflector and a second curved reflector spaced from one another, the first curved reflector being between the light source and the ceiling, and the light source being between the second curved reflector and the ceiling.

8. The lighting assembly of claims 7, wherein the first and second curved reflectors each have a first end, a second end, and a surface, the surfaces of the first and second curved reflectors facing one another.

9. The lighting assembly of claim 8, wherein the second reflector portion further comprises:
a third curved reflector and a fourth curved reflector, each of the third and fourth curved reflectors having a first end, a second end, and a surface, each of the first ends of the third and fourth reflectors being connected with one of the second ends of the first and second curved reflectors, the third and fourth curved reflectors being disposed on opposite sides of the light source, and the surfaces of the third and fourth curved reflectors facing one another.

10. The lighting assembly of claim 7, wherein the first reflector portion comprises:
a first pair of curved reflectors each having a first end, a second end, and a surface, the first ends being connected to one another, the first pair of curved reflectors being disposed on opposite sides of the light source, and the surfaces of the first pair of curved reflectors facing one another.

11. The lighting assembly of claim 10, wherein the first reflector portion further comprises:
a hollow member having a first end and a second end, the first end being connected to the second ends of the first pair of curved reflectors; and
a hollow light collimator having a first end and a second end, the first end of the hollow light collimator being connected with the second end of the hollow member.

12. The lighting assembly of claim 11, wherein the hollow light collimator comprises a plurality of additional curved reflectors.

13. The lighting assembly of claim 7, further comprising a plurality of first reflector portions and a plurality of second reflector portions, the plurality of first reflector portions and the plurality of second reflector portions being disposed alternately along the longitudinal axis of the light source.

14. The lighting assembly of claim 13, further comprising waveguides coupled with the second reflector portions, the waveguides being configured to direct light rays in the second direction and toward the ceiling.

15. The lighting assembly of claim 14, wherein the waveguides comprise a substantially planar reflector extending from the second reflector portion, the planar reflector being spaced from the ceiling such that the light source is closer to the ceiling than the planar reflector.

16. A lighting assembly configured to be mounted to a ceiling, comprising:

a plurality of elongated light sources each having a longitudinal axis, the light sources being arranged substantially parallel with one another in a spaced apart relationship in an array aligned substantially parallel with the ceiling;

a plurality of first reflector portions, each reflector portion being between one of the light sources and the ceiling, and being configured to direct light rays in a first direction away from the ceiling, each first reflector portion comprising;

a first pair of curved reflectors each having a first end, a second end, and a surface, the first ends being connected to one another, the first pair of curved reflectors being disposed on opposite sides of the light source, and the surfaces of the first pair of curved reflectors facing one another;

a hollow member having a first end and a second end, the first end being connected to the second ends of the first pair of curved reflectors; and     a hollow light collimator having a first end and a second end, the first end of the hollow light collimator being connected with the second end of the hollow member;

a plurality of second reflector portions, the plurality of first reflector portions and the plurality of second reflector portions being disposed alternately along the longitudinal axes of the light sources, the second reflector portion being configured to direct light rays in a second direction away from the longitudinal axis, the second direction being substantially parallel with the ceiling and normal to the longitudinal axis; and a plurality of waveguides extending between each pair of adjacent light sources, the waveguides being configured to direct light rays in the second direction and toward the ceiling.

\* \* \* \* \*